United States Patent [19]
Beck et al.

[11] Patent Number: 5,296,702
[45] Date of Patent: Mar. 22, 1994

[54] STRUCTURE AND METHOD FOR DIFFERENTIATING ONE OBJECT FROM ANOTHER OBJECT

[75] Inventors: Jim Beck, Los Gatos; Tom Vyse, Santa Clara, both of Calif.

[73] Assignee: Patchen California, Los Gatos, Calif.

[21] Appl. No.: 920,942

[22] Filed: Jul. 28, 1992

[51] Int. Cl.$^5$ ............................................... G01J 3/50
[52] U.S. Cl. .................................... 250/226; 356/420
[58] Field of Search ........................ 250/226, 223 R; 356/406, 407, 416, 420, 425

[56] References Cited

U.S. PATENT DOCUMENTS

| | | |
|---|---|---|
| 2,514,405 | 7/1950 | Marihart . |
| 2,682,132 | 6/1954 | Marihart . |
| 2,894,178 | 7/1959 | Chesebrough . |
| 3,373,870 | 3/1968 | Black . |
| 3,488,511 | 1/1970 | Mori et al. ........................... 250/226 |
| 3,512,587 | 5/1970 | Shader . |
| 3,590,925 | 7/1971 | Koelsch et al. . |
| 3,609,913 | 10/1971 | Rose . |
| 3,652,844 | 3/1972 | Scott, Jr. . |
| 3,701,218 | 10/1972 | Priest . |
| 3,910,701 | 10/1975 | Henderson et al. ................ 250/226 |
| 4,015,366 | 4/1977 | Hall, III . |
| 4,092,800 | 6/1978 | Wayland, Jr. et al. . |
| 4,369,886 | 1/1983 | Lane et al. . |
| 4,482,960 | 11/1984 | Pryor . |
| 4,527,897 | 7/1985 | Okabe ............................... 356/407 |
| 4,550,526 | 11/1985 | Smucker . |
| 4,558,786 | 12/1985 | Lane . |
| 4,618,257 | 10/1986 | Bayne et al. ....................... 250/226 |
| 4,699,273 | 10/1987 | Suggi-Liverani et al. ...... 250/223 R |
| 4,709,265 | 11/1987 | Silverman et al. . |
| 5,021,645 | 6/1991 | Satula et al. ..................... 250/223 R |
| 5,144,767 | 9/1992 | McCloy et al. . |

FOREIGN PATENT DOCUMENTS

| | | |
|---|---|---|
| 231270 | 11/1984 | Fed. Rep. of Germany . |
| 229625 | 6/1989 | New Zealand . |
| 203340 | 12/1967 | U.S.S.R. . |
| 471074 | 6/1973 | U.S.S.R. . |
| 382367 | 8/1973 | U.S.S.R. . |
| 547183 | 4/1977 | U.S.S.R. . |
| 590598 | 7/1947 | United Kingdom . |

OTHER PUBLICATIONS

W. L. Felton et al., "A Microprocessor Controlled Technology To Selectively Spot Spray Weeds," Dec. 1991.

B. B. Nitsch et al., "Visible And Near Infrared Plant, Soil And Crop Residue Reflectivity For Weed Sensor Design," Paper No. 913006, Jun. 23-26, 1991.

Geoffrey J. Shropshire et al., "Fourier and Hadamard Transforms For Detecting Weeds in Video Images," Paper No. 89-7522, Dec. 12-15, 1989.

Geoffrey J. Shropshire et al., "Optical Reflectance Sensor for Detecting Plants," SPIE vol. 1379, 1990.

*Primary Examiner*—David C. Nelms
*Assistant Examiner*—K. Shami
*Attorney, Agent, or Firm*—Skjerven, Morrill, MacPherson, Franklin & Friel

[57] ABSTRACT

An apparatus and a method are provided for selectively eliminating weeds in agriculture operations. To provide selective elimination, at least two light (radiation) emitters, powered by an internal power source, are modulated to switch on and off at very high speeds. Each emitter emits radiation of a different emitter wavelength. The on/off modulation of one emitter is phase shifted by approximately 90° with respect to the modulation of the other emitter. The pair of emitters are focused on a particular spot on the ground. The light beams, provided by the emitters, are reflected off a plant or the soil and are intercepted by a photodetector. Because plants have a characteristic spectral reflectance in regions of the electromagnetic spectrum which can be discriminated from the spectral reflectance of the background earth, the relative amplitudes of the reflected radiation at the two emitter wavelengths varies depending on whether the radiation is reflected off a plant or the soil. A ratio of the radiation at the two emitter wavelengths received by the photodetector is converted to a phase. This phase is compared to an initial reference phase of the modulation of one of the emitters. A controller uses this phase information to determine the presence or absence of a plant and then eliminates the weed.

42 Claims, 6 Drawing Sheets

STRUCTURE AND METHOD FOR DIFFERENTIATING ONE OBJECT FROM ANOTHER OBJECT

BACKGROUND OF THE INVENTION

1. Field of the Invention

This invention relates to a structure and a method for differentiating one object from another, and in particular to a structure which optically detects weeds and then eliminates those weeds.

2. Description of Related Art

In many situations it is necessary to distinguish one type of object from another. While this is essential in such diverse areas as manufacturing, data processing and mail delivery, object differentiation is particularly important in agriculture. For example, the ability to distinguish weeds from desired plants is essential to allow weeds to be destroyed because even sparse weed populations decrease the moisture, light and nutrients available to crop plants, thereby significantly reducing yields of these crops. Additionally, weeds can clog machinery and impede access to crops during farm operations such as harvesting. Spraying of herbicide is a conventional method of controlling weeds. However, when spraying herbicide to control scattered weeds, most of the herbicide is wasted by being deposited on bare soil where the herbicide has no effect. Because herbicides are expensive, many growers attempt to save money by using less herbicide. However, larger chemically-tolerant weeds often escape control because of insufficient herbicide application. Moreover, herbicides may have highly undesirable effects on the environment, for example, by causing contamination of ground water or causing chemical burning of different crops in adjacent fields during floods. Thus, a need exists to reduce both herbicide cost and environmental impact by selectively spraying only the weeds.

Methods for optically distinguishing between soil and plants are currently known in the art. However, many of these methods use devices which rely on natural sunlight to create a reflected image. Thus, the devices cannot operate at night, and are seriously impaired under cloudy conditions, or even when operated in shadows. Other methods for optically distinguishing between soil and plants use devices which rely on an artificial white light source to create the reflected image. However, under normal (i.e. sunny) operating conditions, this artificial light source must compete with the sun which is thousands of times brighter and constantly changing in brightness and spectral distribution. Therefore, either method, i.e. using natural sunlight or an artificial white light source, fails to reliably provide an accurate wavelength signature of objects in the field of view of the device sufficient to eliminate individual weeds. Indeed, applications for these methods have been limited to weed control of low-till or no-till field crops where this lack of precision can be tolerated. However, orchards, vineyards, and row crops require a high degree of accuracy in weed control. Thus, a need exists for a device which provides accurate optical sensing of the weeds and efficient elimination of those weeds.

SUMMARY OF THE INVENTION

In accordance with the present invention, structure and method are provided for differentiating between different types of plants thereby to allow identification of, and thus selective elimination or treatment of, individual plants. In one embodiment of this invention, two light emitters provide selectively modulate monochromatic light beams of different wavelengths. These light beams are focussed at a small surface area on the ground (which may be bare ground, desired plants or undesired weeds). A detector detects portions of these light beams reflected by the surface area and provides a signal indicative of whether the detected light was reflected by a plant or by some non-plant object such as soil. A controller analyzes this signal and, assuming a plant is detected, responds by activating a device to take some action with respect to the plant. If the plant is a weed, the desired action might be to spray herbicide on the weed.

The present invention significantly reduces the use of herbicides by precisely targeting individual plants to be eliminated. Moreover, the present invention is operable under a wide variety of conditions including windy conditions, bright sunlight, artificial illumination, or even total darkness. In fact, applying herbicide with the present invention at night has some significant advantages. Cooler temperatures allow longer and more efficient working hours at critical times during the growing season. Moreover, absence of sun prolongs the effectiveness of some herbicide. The higher relative humidity at night aids foliage wetting which increases the effectiveness of the herbicide application. The absence of wind frequently occurring after sunset eliminates over-spray. Therefore, the present invention may result in greatly enhanced efficiency in the use of herbicide to eliminate weeds.

The cost of labor and equipment are substantially related to the speed at which a spray vehicle moves through a field, an orchard or a vineyard. Using traditional spraying methods, the speed of the spray vehicle may be limited by air turbulence resulting from the motion of the equipment and the associated over-spray. In one embodiment of the present invention, a weeder uses a spray nozzle which directs at the plant being sprayed a very narrow solid cone of spray. This cone of spray effectively eliminates over-spray and allows much higher vehicle speeds.

The present invention brings farmers closer to the goal that no weed is overlooked, no weed gets more herbicide than is required, and little or no herbicide is sprayed on bare ground. The combined benefits include cost savings due to reduced amounts of herbicide applied, reduced labor cost, reduced equipment operating cost, improved weed control, and dramatically reduced exposure of both crops and workers to the herbicide.

This invention will be more fully understood in light of the following detailed description taken together with the attached drawings.

DETAILED DESCRIPTION OF THE DRAWINGS

The following description is meant to be illustrative only and not limiting. Other embodiments of this invention will be obvious in view of this disclosure.

Figure 1:
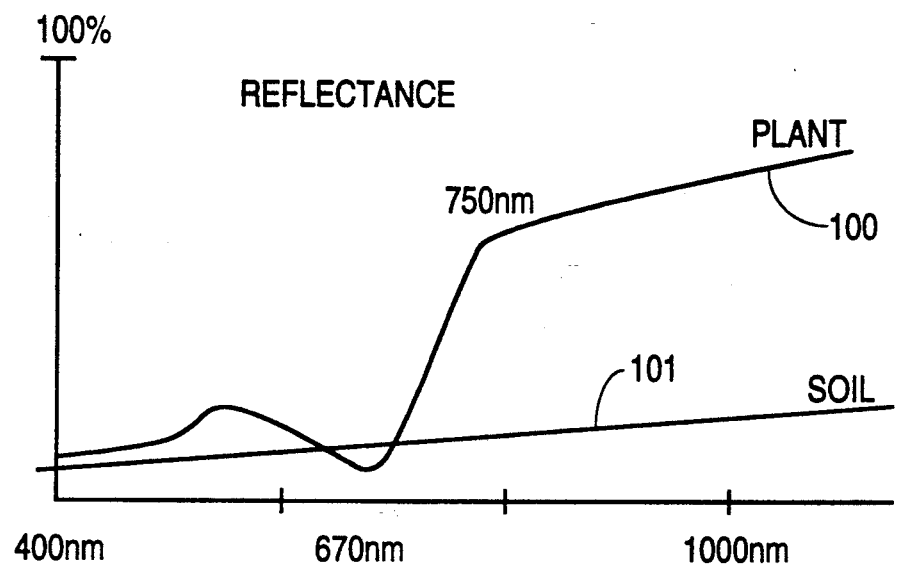
FIG. 1 illustrates a graph of representative curves of the reflectance of a plant and of soil for various wavelengths.

Radiation is reflected from or conversely absorbed by surfaces, depending upon the characteristics of those surfaces. In the case of plants, radiation in the blue and red wavelengths (i.e. 380 nanometers to 700 nanometers) is strongly absorbed by the chlorophylls in the plants while the near infrared wavelength (i.e. 700–1000 nanometers) is strongly reflected. Other substances, such as soil, absorb much more of the radiation in many of those wavelengths. FIG. 1 illustrates a graph having an x-axis representing wavelength of light from 400 nanometers to approximately 1000 nanometers and a y-axis representing percentage of reflectance. FIG. 1 illustrates that for a wavelength of, for example 750 nanometers, a typical plant (represented by curve 100) is easily distinguished from typical soil (represented by curve 101) because the plant reflects a higher percentage of incident light than the soil. Note that a plant has minimum reflectance and, in fact, reflects less than soil at a wavelength of approximately 670 nanometers. In accordance with the present invention, a plurality of monochromatic light sources are used to create the reflected light, rather than natural sunlight or an artificial white light source. The optimum light sources to distinguish a plant from soil, as shown in FIG. 1, have a wavelength of approximately 670 nanometers (in the upper red waveband) and a wavelength of approximately 720–750 nanometers (in the near infrared waveband).

Figure 2:
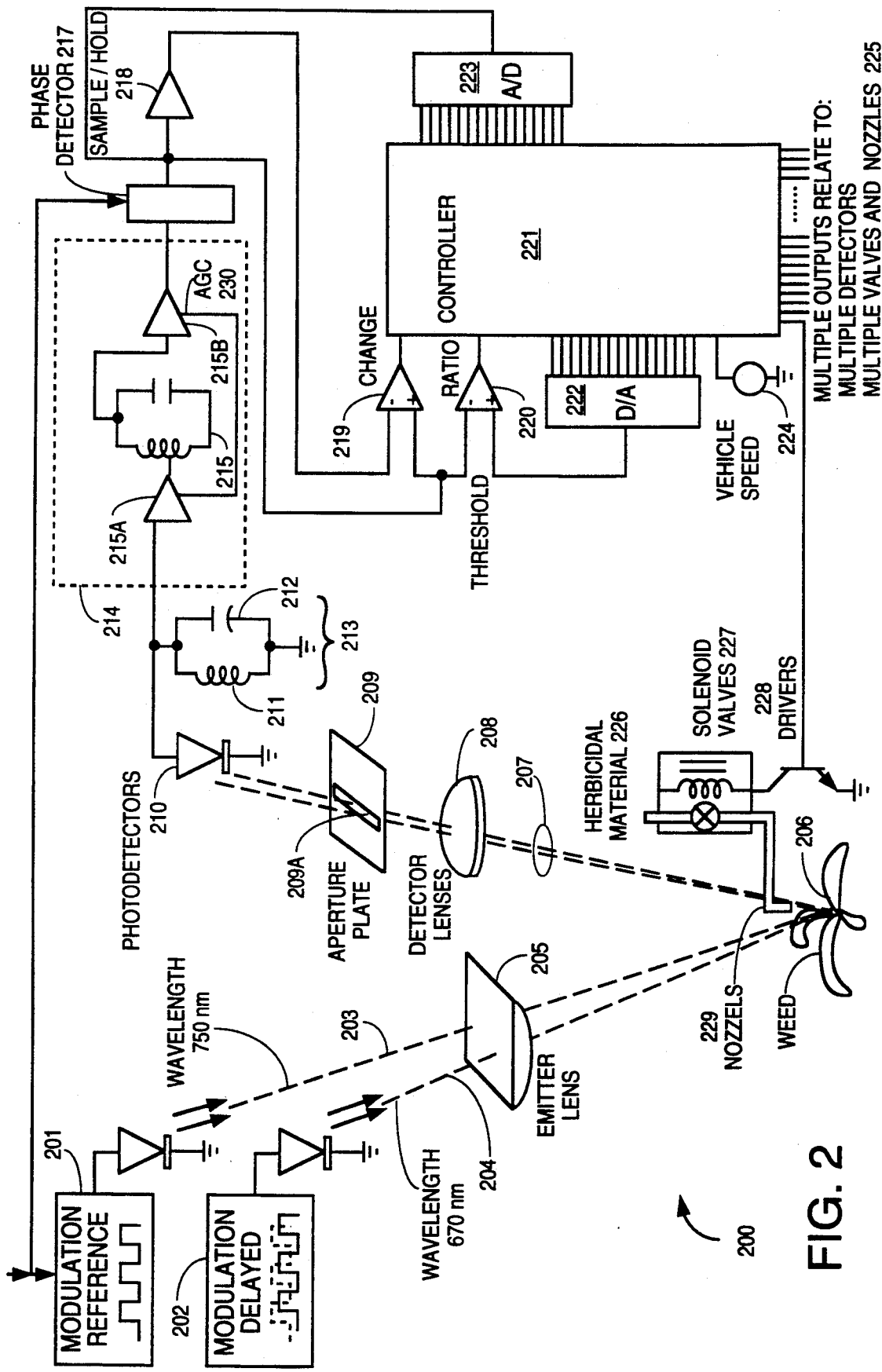
FIG. 2 shows schematically one embodiment of a weeder in accordance with the present invention.

FIG. 2 illustrates one embodiment of structure in accordance with this invention capable of being used as, for example, an intelligent weeder. In this embodiment, two monochromatic light sources 201 and 202 are provided. Monochromatic light source 201 emits a light beam 203 having a wavelength of 750 nanometers, while monochromatic light source 202 emits a light beam 204 having a wavelength of approximately 670 nanometers. Light sources 201 and 202 are typically commercially available light emitting diodes (LEDs) formed from gallium arsenide, gallium arsenide phosphide, or gallium aluminum arsenide, which provide an extremely reliable and cost-effective source of monochromatic light. Other light sources may include lasers or broad band light sources with filters.

If diodes 201 and 202 are merely turned on with a DC current, and directed at a predetermined surface area 206, the reflection of the sun from surface 206 would significantly impair if not render inoperable structure 200. Thus, in accordance with the present invention, the current to diodes 201 and 202 is selectively modulated. In one embodiment the modulation is such that diodes 201 and 202 are driven at the highest possible frequency within their bandwidth constraints while remaining compatible with the other components of the system (described below in detail). In this embodiment, diodes 201 and 202 are modulated at a frequency of 455 KHz. Note that as the frequency increases, the more information is available to the user within one predetermined time cycle, thereby providing more sensitive measurements.

Light beams 203 and 204, emitted from diodes 201 and 202 respectively, are focused by emitter lens 205 on a predetermined area of surface 206 which may contain a plant, soil, or a combination of plant and soil. Light beams 207, reflected off surface 206, are detected by photodetector 210 after passing through detector lens 208 and aperture 209A of aperture plate 209. The light detected by photodetector 210 will comprise different ratios of wavelengths of monochromatic light depending upon whether light beams 203 and 204 are reflected by a plant or by soil.

Figure 3:
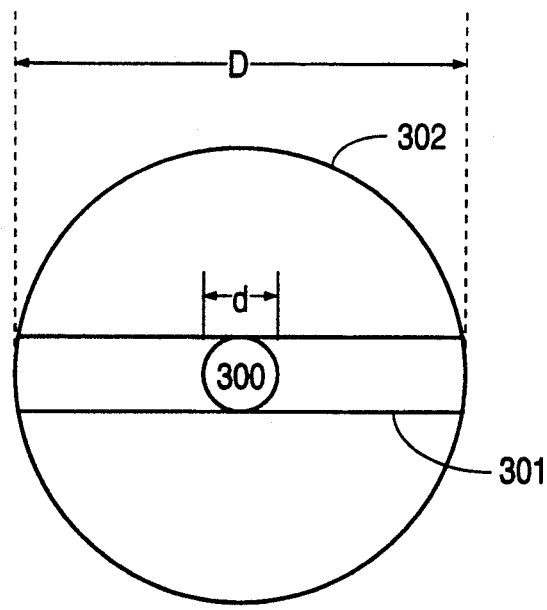
FIG. 3 illustrates the effect of the aperture plate in the detection of a weed.

Note that the total light reflected from a surface, such as a leaf of a plant, is proportional to the total reflecting area. For example, referring to FIG. 3, if the diameter d of a weed 300 is one-quarter ($\frac{1}{4}$) inch (thus, having an area of $\pi/64$ square inches) and the diameter D of the total reflecting area 302 is one (1) inch (thus, having an area of $\pi/4$ square inches), weed 300 represents 1/16th of the total reflecting area and therefore is only a 1/16th contributor to the total reflected light. However, if the light reflected from the same size weed (one-quarter inch diameter) is limited by an aperture 301 which is one inch long, but only one-quarter inch wide, then the light reflected from the weed begins to approach one-quarter of the new total reflecting area (i.e. area of aperture 301). Thus, in this example, the signal strength of the reflected light from the surface increases by a factor of four. Therefore, it logically follows that by introducing aperture plate 209 (FIG. 2) which includes an aperture 209A having a length which is significantly greater than its width, the present invention replaces a typical squared area function (i.e., $D^2/d^2$) with a linear relationship (i.e. $D/d$).

To ensure proper alignment between detector lens 208, aperture 209A of aperture plate 209, and photodetector 210, one embodiment of the present invention provides an aperture 209A which is much smaller than detector lens 208. Moreover, this embodiment of the present invention provides an image of reflected beams 207 through detector lens 208 which is smaller than the size of photodetector 210. In this manner, any misalignment between these three elements is rendered non-critical so long as the misalignment is within certain limits set by the size of aperture 209A, the size of diode 210 and the distance of diode 210 from aperture 209A, among other parameters. Note that increasing the size of photodetector 210 produces an undesirable increase in capacitance. Thus, ideally photodetector 210 is only slightly larger than aperture 209A to minimize capacitance. However, in accordance with the one embodiment of the present invention, this capacitance is buffered by a cascode amplifier circuit, thereby providing substantially the same bandwidth as if a lower capacitance device i.e. smaller photodetector 210 were used.

Figure 4:
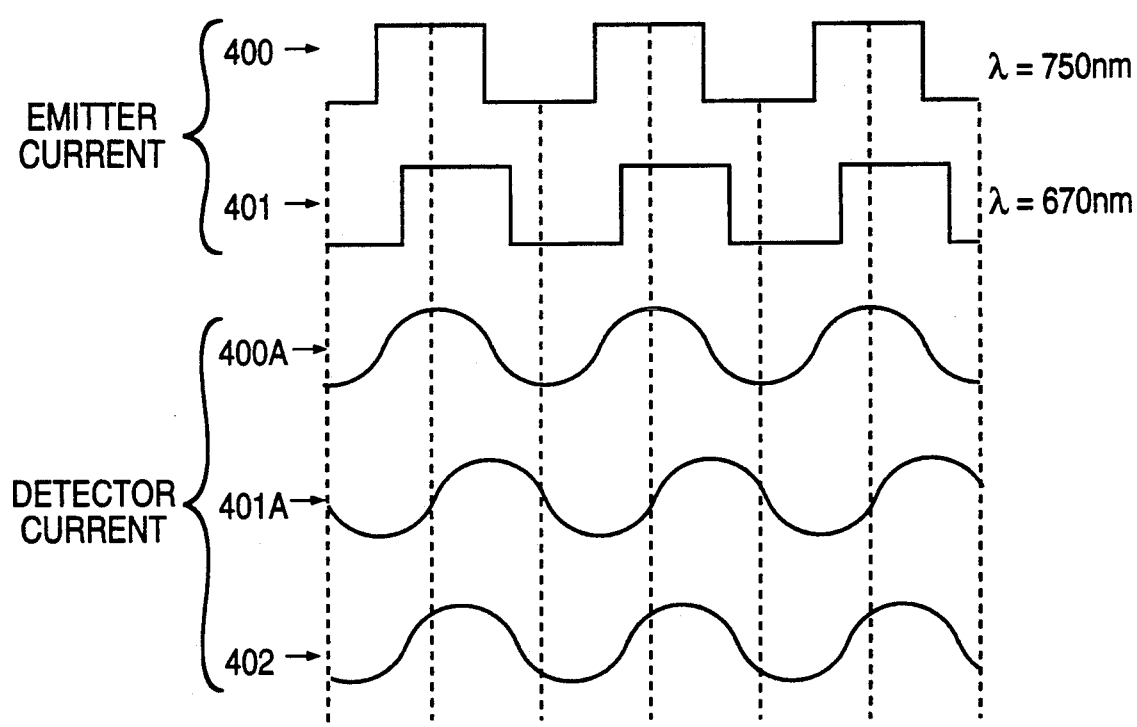
FIG. 4 shows waveform envelopes of two different wavelengths before and after reflectance from a surface.

Photodetector 210 converts photo-energy from reflected light beams 207 into low level electrical signals which represent the color signature of the object(s) in the field of view. For example, FIG. 4 illustrates waveform envelopes 400 which have a wavelength of, for example, 750 nanometers and waveform envelopes 401 which have a wavelength of, for example, 670 nanometers. Note that diodes 201 and 202 (FIG. 2) are modulated by a signal at the same frequency and for the same duty cycle thereby forming substantially identical waveform envelopes.

However, as shown in FIG. 4, the modulation of one diode (providing waveform envelopes 400) is approximately 30°-45° out of phase with the modulation of the other diode (providing waveform envelopes 401). After light beams 203 and 204 reflect off surface 206 (time period 404), photodetector 210 (FIG. 2) provides a current, wherein the phase of the current is a function of the relative amounts of light of either wavelength. For example, waveform 400A represents the current provided by the photodector upon detection of waveform envelopes 400. Similarly, waveform 401A represents the current provided by photodector 210 upon detection of waveform envelopes 401. Note that waveform 401A is phase shifted now by approximately 90° compared to waveforms 400A. This phase shift is due to the higher capacitance of diode 202 (FIG. 2) which provides waveform envelopes 401 verses the capacitance of diode 201 which provides waveform envelopes 400, and delays in photoemission (i.e. emitter current verses actual light emmission). Photodetector 210 sums waveforms 400A and 401A and provides waveform 402 which is phase shifted in this example by approximately 45°. Thus, the phase shift of waveforms 402 is a function of the relative phases of waveforms 400A and 401A but also the difference in phase delay inherent in the different emitters. Note that after light beams 203 and 204 reflect off surface 206 (FIG. 2), the resulting summed waveforms 402 vary in amplitude (not shown in FIG. 4) depending on whether light with a wavelength of 750 nm or 670 nm is being reflected or absorbed. This amplitude difference causes another source of phase shift in detector current 402. This variable phase shift contains the desired spectral reflectance information.

A tuned circuit 213 comprising inductor 211 and capacitor 212, placed in series with photodetector 210, resonates due to excitation from photodetector 210. The output waveform of tuned circuit 213 therefore remains substantially sinusoidal. Tuned circuit 213 rejects everything which is not sinusoidal and not at a selected frequency (i.e. undesirable harmonics). The accepted sinusoidal waveform is then provided to circuitry 214 which typically comprises amplifiers 215A and 215B and tuned circuit 215.

Circuitry 214 provides a very high gain for the modulated signals provided by reflected light beams 207 and at the same time the inductor 211 in tuned circuit 213 passes the unwanted DC signal output from diode 210 due to the sunlight directly to ground. Automatic frequency control (AFC) (not shown) is used to insure that tuned circuit 215 provides the maximum out-of-band rejection, thereby minimizing the interference of sunlight reflected off surface 206 with the modulated light beams 207 reflected from the same surface. Automatic gain control (AGC) 230 is used to provide the widest possible dynamic range for amplifiers 215A and 215B. Circuitry 215B clips the amplified sinusoidal waveform to provide a predominately squared waveform to phase detector 217. Phase detector 217 takes the squared output waveforms of circuitry 214, and multiplies that waveform by the waveform of diode 201. In other words, phase detector 217 determines the phase shift of the output waveform of circuit 214 with respect to the original phase of the waveform provided by diode 201. In one embodiment, phase detector 217 is an LM3089 FM receiver IF system manufactured by National Semiconductor.

To enhance the ability of system 200 to process information rapidly, a sample and hold circuit 218 is coupled to phase detector 217. The output signal from the sample and hold circuit 218 is provided to the negative input terminal of comparator 21? . The input signal to the sample and hold circuit 218 is provided to the positive input terminal of comparator 219, to the negative input terminal of comparator 220 and to the analog to digital converter 223. Comparator 219 therefore provides a comparison of the instantaneous value of the input to sample and hold circuit 218 to the last value detected by sample and hold circuit 218 and thus provides an indication as to whether the instantaneous change in the analog signal being detected by diode 210 is positive or negative. The output signal from comparator 219, provided to controller 221, thus indicates the direction of change of any particular color signature. Thus, comparator 219 supplies information to controller 221 which allows controller 221 to determine the magnitude and direction of the phase shift of the summed reflected radiation with respect to the initial modulated beams 203 and 204.

Ratio comparator 220 compares the output signal of digital to analog converter 222 to the instantaneous value of the output signal from phase detector 217. The threshold reference voltage in one embodiment is adjusted manually for various types of background mineral soil and partially decomposed organic material. In another embodiment, the threshold reference voltage is adjusted automatically by an appropriate software in controller 221 and d/a converter 222. In this manner, controller 221 provides a continuous update of the background material to comparator 220 via digital to analog converter 222. Ratio comparator 220 has a binary output signal which depends on whether the ratio of wavelengths detected in the field of view exceeds that of the reference background. In accordance with the present invention, controller 221 analyzes signals provided by comparators 219 and 220 and determines whether a weed is detected with the predetermined area of surface 206. Note that although only single components (for example photodetector 210) are illustrated, system 200 in some embodiments will comprise a plurality of photodetectors 210 and the appropriate signal processing circuitry.

If a weed is detected, controller 221 activates a device to eliminate the weed. In FIG. 2, controller 221 provides a drive signal (typically high for transistor 228 as shown) to the base of NPN bipolar transistor 228 if a weed is detected, thereby turning on transistor 228. Turning on transistor 228 subsequently opens a solenoid actuated valve 227 which releases a jet of herbicide 226 via nozzle 229.

To minimize interference with the photodetection of a plant, herbicide 226 is not sprayed at the same time that photodetector 210 is receiving reflected light beams 207 from surface area 206. Therefore, spray nozzle 229 is positioned behind (relative to the movement of the vehicle) surface 206, i.e. the field of view of photodetector 210.

Therefore, to properly direct the jet of herbicide 226 at surface 206, controller 221 delays the signal to transistor 228 in relation to the speed "V" of the vehicle (as provided by vehicle speed indicator 224) and the distance "X" of the jet behind the weed at the time the weed is detected. This delay time "T" is merely $T = X/V$ where X equals distance in feet, V equals velocity in feet per second and T equals time in seconds. Many types of vehicle speed indicators are appropriate, including doppler radar speed indicators. In the present invention, vehicle speeds of greater than 10 miles per hour (0.16 inches per millisecond) are possible, because the system provides a wide margin of computing power with controller clock speeds in the megahertz range.

The operating software of controller 221 is stored in solid state memory. This software can be quickly and easily tailored for different crops and different kinds of weed conditions. For example, if photodetector 210 has detected a weed for three consecutive timeframes, and its neighboring photodetectors have also seen the same weed in two of those three timeframes, then solenoid valves on either side of valve 227 (which is specifically triggered) may be turned on in anticipation of a large weed approaching.

In one embodiment, nozzles 229 are directed towards the ground. Each nozzle 229, aimed at surface 206, is associated with a particular photodetector 210. Controller 221 controls each valve 227 by signals provided to a base of each transistor 228. Transistor 228 is driven to optimize the switching speed of solenoid valve 227. This solenoid valve 227 typically opens and closes in approximately 5-10 milliseconds. Nozzles 229 emit short bursts of herbicide 226 directly onto the plant foliage, thus avoiding spraying the surrounding area. In an application of this invention, the light detector can be used to detect weeds spaced some distance from the valve through which herbicide is to be ejected. This application is particularly useful in controlling weeds along highways. One of the problems in controlling weeds along highways is that the vehicle containing the herbicide must stay on the highway, whereas the weeds grow on the shoulders or areas beside the highway. Thus in accordance with this invention a light detector would detect weeds at a given location off the highway. A nozzle through which the herbicide would be ejected is then calibrated to have the proper angle to eject a spurt of herbicide so that the herbicide will land on the area with the weeds. The herbicide will be ejected at a selected angle and for a selected period of time to insure that the area of ground on which the weed grows is covered by the herbicide but that other adjacent areas are hopefully not covered by the herbicide. The computation of the angle and pressure required to eject the herbicide to the proper location beside the road is capable of being done using well known fluid flow and dynamics equations.

Projecting liquid herbicide over long distances (several feet) to the targeted weed requires a solid stream of herbicide of sufficient mass. If this solid stream of herbicide is turned on and left on continuously while weeds are present in the optical field of view, more herbicide is sprayed than is necessary.

To minimize the amount of herbicide while maintaining the same trajectory, the stream is pulse-width modulated. The duty cycle of the pulse-width modulation becomes the equivalent of a flow adjustment without affecting the pressure or nozzle dimensions.

System 200 has significant advantages when used as a weeder by moving faster through the rows of crops in comparison with conventional weeders. The cost of labor and equipment are substantially related to the speed at which the equipment is able to move through, for example, an orchard or a vineyard. Using traditional weeding methods, the speed at which the vehicle is able to travel is limited by air turbulence resulting from the motion of the equipment and the associated over-spray. Spray nozzle 229 directs a very narrow solid cone spray. Thus, the present invention effectively eliminates over-spray and allows much higher vehicle speeds.

Figure 5:
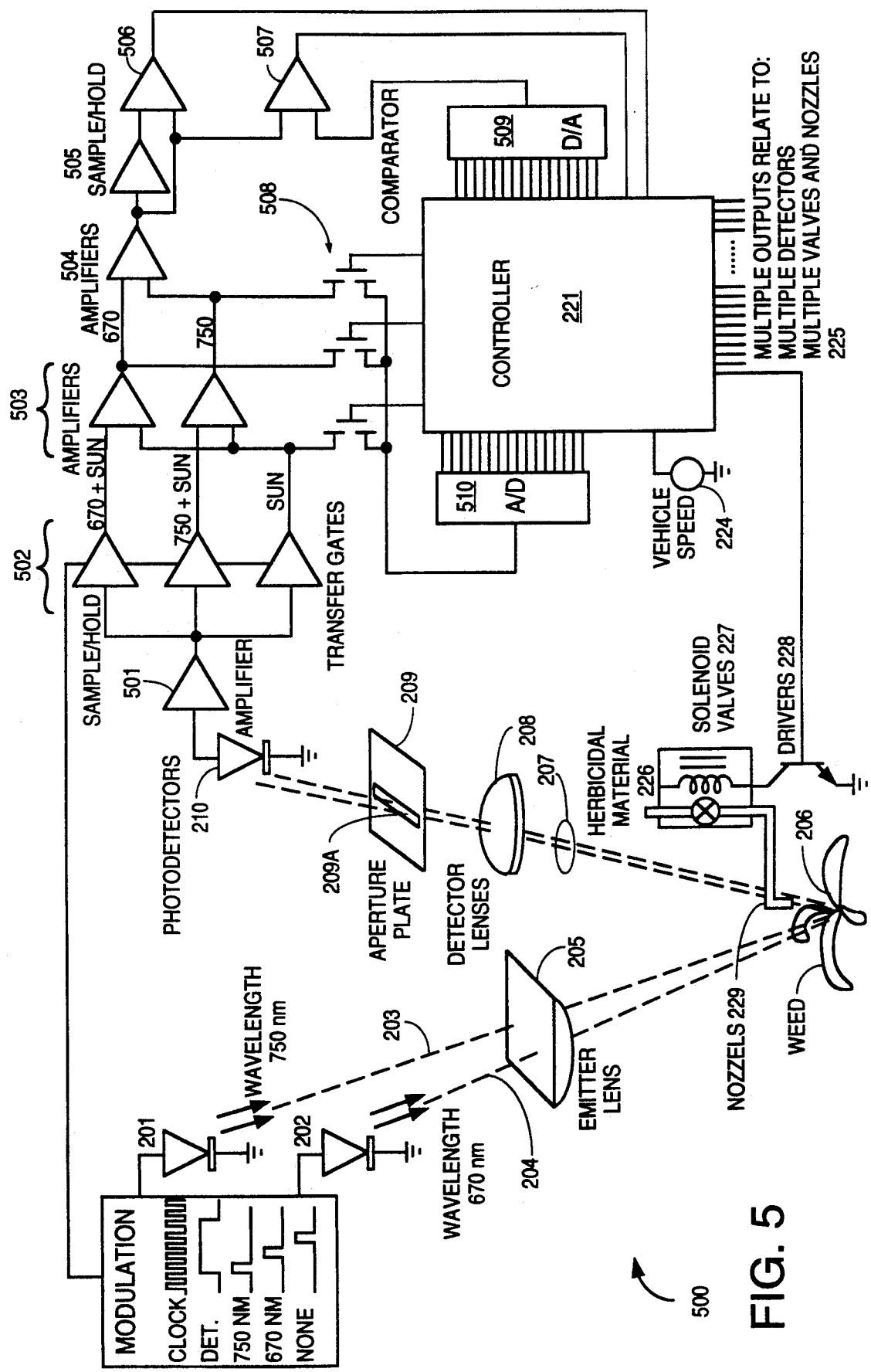
FIG. 5 illustrates another embodiment of a weeder in accordance with the present invention.

In another embodiment of the present invention illustrated in FIG. 5, light beams 203 and 204 are isolated from the light of the sun. Specifically, diodes 201 and 202 are sequentially turned on and off at a high frequency, of for example 1 MHz. Amplifier 501 buffers the voltage generated by photodetector 210 and provides an amplified voltage to the sample and hold circuits 502. Sample and hold circuits 502 are gated by the same clock signal which controls light sources 201 and 202. In this manner, one sample and hold circuit is turned on at the same time as light source 201, another sample and hold circuit is turned on at the same time as light source 202, and the last sample and hold circuit is turned on when neither light source 201 nor 201 are turned on. Thus, one sample and hold circuit provides an output signal representing light having a wavelength of 670 nanometers plus the sun, another sample and hold circuit provides an output signal representing light having a wavelength of 750 nanometers with the sun, and the last sample and hold circuit provides an output signal representing only the sun.

Amplifiers 503 substract out the signals generated by the sun, thereby outputting only the signals representing light having a wavelength of 670 and 750 nanometers. Amplifier 504 sums the output signals from amplifiers 503. Note that these output signals are also transferred to analog to digital converter 510 by analog transfer gates 508. Analog to digital converter 510 is coupled directly to controller 221. The output signal from sample and hold circuit 505 is provided to the negative input terminal of comparator 506. The input signal to sample and hold circuit 505 is provided to the positive input terminal of comparator 506, and to the negative input terminal of comparator 507. Comparator 506, in this configuration, provides an output signal indicative of the change of any particular color signature (see also comparator 219 of FIG. 2). Therefore, comparator 506 supplies information to controller 221 which allows controller 221 to determine the magnitude and direction of the phase shift of the summed reflected radiation with respect to light beams 203.

Comparator 507 compares the output signal of digital to analog converter 509 to the instantaneous value of the output signal from amplifier 504. The output signal of digital to analog converter (see also digital to analog converter 222 in FIG. 2) is adjusted to compensate for the background mineral soil and partially decomposed organic material. Thus, comparator 507 has an output signal which varies depending on whether the ratio of wavelength detected in the field of view exceeds that of the reference background. Controller 221 analyzes the signals provided by comparators 506 and 507 to determine whether a weed is detected.

Figure 6A:
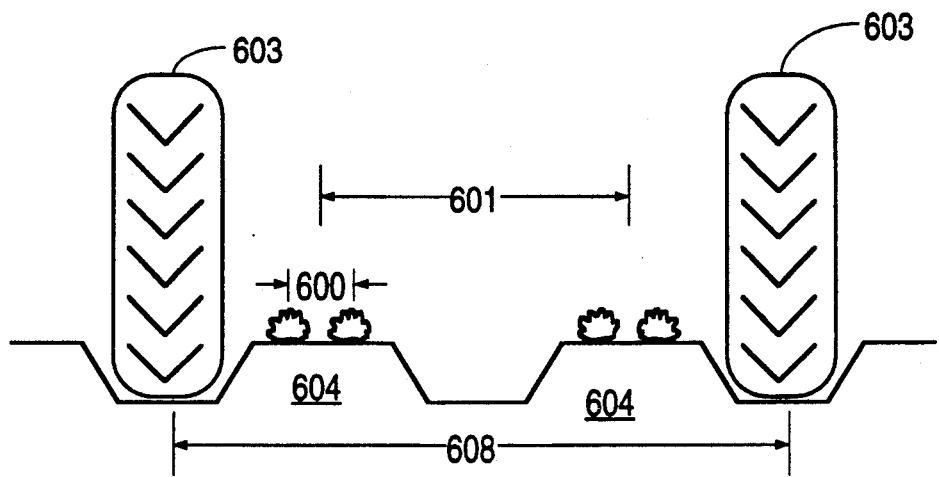
FIGS. 6A and 6B show typical spacing required in a row crop field.
Figure 6B:
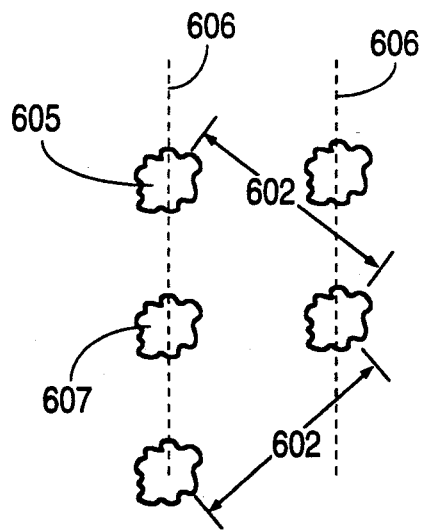

Note that in other embodiments of the present invention, a mechanical device such as a rotary hoe, is used instead of herbicide to eliminate the weed or undesirable plant. FIGS. 6A and 6B illustrate typical spacing in a row crop field. As shown in FIG. 6A, row crops 605 are typically planted in two rows on top of beds 604. The spacing 600 between these two rows is approximately 6-12 inches, whereas the spacing 601 between midpoints of beds 604 is approximately 24-48 inches. The tires 603 of, for example, a tractor (not shown) straddle two beds 604 at a distance 608 of approximately 48-96 inches. The rows 606, shown in FIG. 6B, are densely planted to insure maximum production. However, particularly during optimal growing conditions, too many plants grow in close proximity to one another in a row and must be thinned out to allow for proper development of each plant. Specifically, plants 607 must be hoed out to provide spacing 602 of approximately 6-12 inches between plants 605 which are designated to remain. Thus, a weeder shown in either FIG. 2 or FIG. 5 equipped with a solenoid-operated hoe instead of a solenoid-operated valve provides this thinning function, in addition to weeding.

Figure 7:
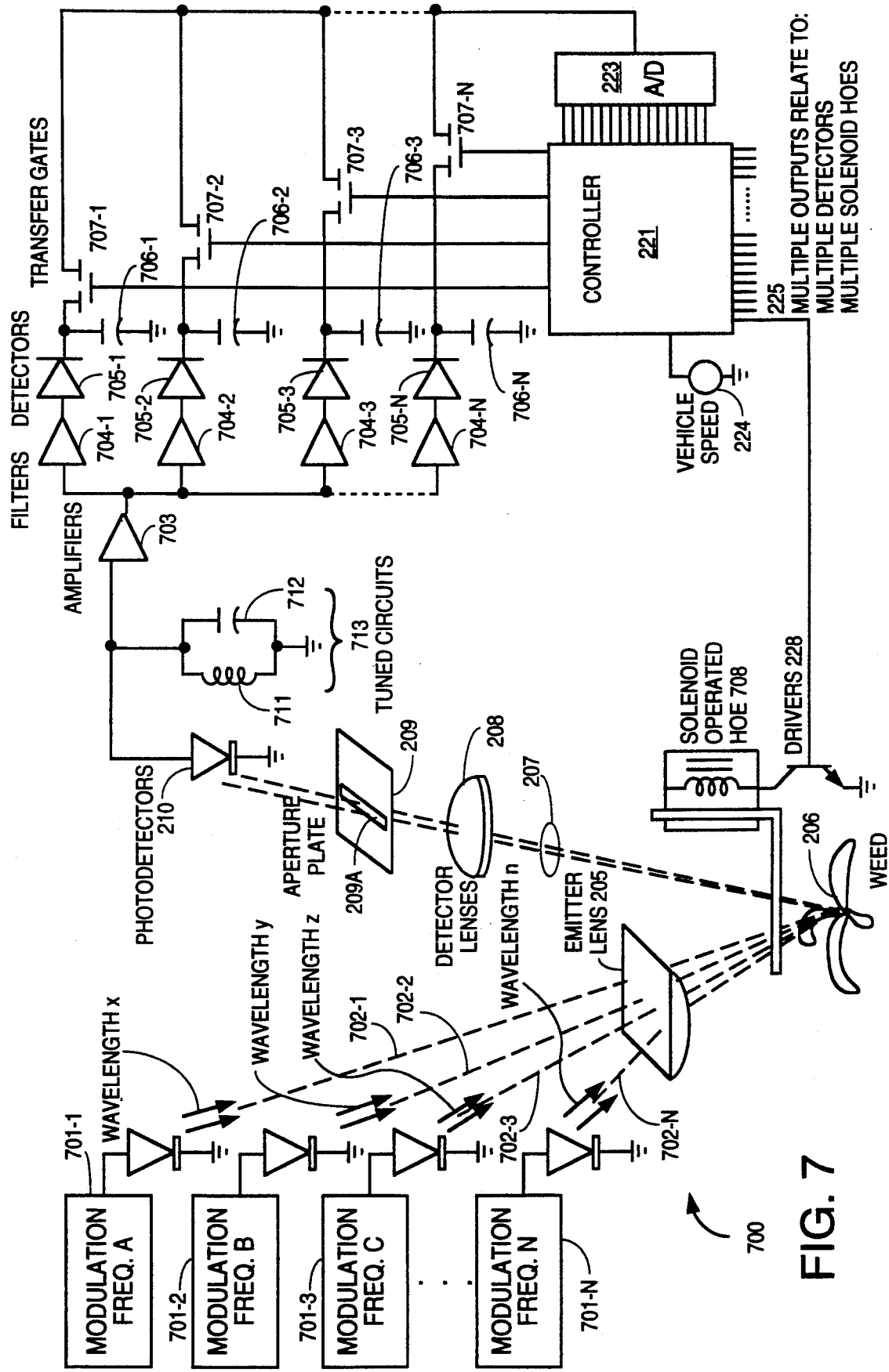
FIG. 7 illustrates yet another embodiment of a weeder in accordance with the present invention.

In another embodiment of the present invention shown in FIG. 7, the intelligent weeder 700 discriminates between various weed and crop plant species on the basis of spectral reflectance, size, shape, and plant location. Weeder 700 uses a plurality of monochromatic light sources 701-1, 701-2, 701-3 . . . 701-N (where N is the total number of light sources, each light source having a different wavelength). In this embodiment, microcontroller 221, in addition to the functions described in reference to FIGS. 2 and 5, must be able to analyze the following parameters: the size of individual leaves, the shape of individual leaves, the location of the plant with respect to a designated row, and spacing within the row.

The various wavelengths of light sources 701-1-701-N are multiple tone modulated, each wavelength corresponding to a particular modulation frequency. Light beams 702 are reflected from surface 206 in the field of view of photodetector 210 in a manner described in reference to FIG. 2. Tuned circuit 713, comprised of inductor 711 and capacitor 712, is generally broader in bandwidth than tuned circuit 213 (FIG. 2) to accommodate the range of modulation frequencies. Amplifier 703 provides gain and impedance matching, while filters 704 are narrow bandpass filters, each filter being set to one of the modulation frequencies. Detectors 705 convert output signals from filters 704 to dc levels proportional to the content of the various wavelengths in the reflected light beams 207. Analog transfer gates 707 multiplex these dc levels to a high speed analog to digital converter 223. Converter 223 subsequently drives controller 221 which activates transmitter 228 and solenoid-operated hoe 708.

In another embodiment of the present invention (not shown), the weeder as illustrated in FIGS. 2, 5, or 7 is carried by an individual, either as a hand-held or as a backpack unit. Note that in this embodiment, the optical system (for example, diodes 201, 202, emitter lens 205, detector lens 208, aperture plate 209, and photodetector 210 of FIG. 2) is coupled to a spray wand by fiber optic cable. The wand also contains accelerometers to determine the speed and direction of travel of the wand.

A weeder in accordance with the present invention provides a significantly more efficient way of eliminating weeds in any crop. For example, in a typical orchard there are basically three operations involved in conventional weed control, some operations being performed two or more times per year depending on the crop and the particular area of the country. During a first operation in the early spring, a three to five feet wide row is sprayed with a heavy layer of preemergence herbicide. The mix ratio is rich and the coverage is extremely heavy because missing the opportunity for a complete kill of annual weeds at this time means higher cost later when the weeds mature. Additionally, the herbicide mixture is often laced with a powerful postemergence herbicide to attack the annuals which have already emerged and the perennial weeds remaining from the last growing season. The operation involves a driver, a sprayer mounted on a tractor, and a considerable amount of very expensive herbicide. During a second operation in the summer months, the "middles" (i.e., the area between sprayed rows which is typically 15 to 17 feet wide) are mowed or tilled. Again, a driver is needed along with a mower and, most likely, a different tractor than the one used to spray. Typically, this operation is repeated two to four times during the growing season. Finally, in a third operation, a postemergence herbicide is applied to the weeds which escaped the winter preemergence application in the sprayed rows. This application is often accomplished with two men walking behind a tractor with hand-held spray wands. The tractor moves down the center of a middle row whereas the two workers spray weeds in the previously sprayed rows, one worker in each of the two rows adjoining the middle row. Mounted on the tractor is a sprayer which is pumping a heavy concentration of herbicide designed to knock down fully grown healthy weeds. Alternatively, back-pack spray tunes are carried by workers and individual weeds are located and sprayed. This operation is also done two or more times per year.

In accordance with the present invention, the spraying and mowing operations can be done simultaneously. Thus, one tractor is employed for the entire season rather than the three described above. The intelligent weeder, in one application, is mounted on front of the tractor. A conventional rotary or flail mower is then mounted on the rear of the tractor. In this manner, the winter preemergence treatment can be done with a fraction of the herbicide used in conventional methods, or in some cases, eliminated entirely because the weeder selectively and precisely targets application of the herbicide, and therefore is much more effective later in the growing season. In addition, as noted above, the entire operation is accomplished with one driver and one tractor. Additionally, two different types of spraying can be done simultaneously. Specially, a preemergence herbicide (directed to all ground area) can be applied by conventional methods while a postemergence herbicide (directed only at predetermined plants) can be applied in accordance with the present invention.

Moreover, a weeder in accordance with the present invention is capable of operating under a wide variety of conditions, including windy conditions, bright sunlight, artificial illumination, or total darkness, thereby allowing 24 hour operation. Spraying herbicide at night has some significant advantages because cooler conditions allow longer and more effective working hours at critical times during season. Specifically, the higher relative humidity at night aids foliage wetting, thereby prolonging effectivity of the herbicide material, and the absence of wind after sunset eliminates over-spraying. Therefore, in addition to significantly reducing the cost of herbicide associated with the elimination of weeds, the present invention, by having the capability of operating at night, provides additional advantages.

Additionally, the present invention minimizes or even eliminates the use of preemergence herbicides in favor of the less costly and more environmentally friendly postemergence herbicides. Postemergence herbicides are applied to individual plants and enter the plants through their foliage. Preemergence herbicides are applied to the soil and prevent new seeds from germinating. Preemergence herbicides by design persist for long time periods in the soil and are therefore the subject of increasing government regulation. Moreover, these preemergence herbicides are generally more costly than postemergence herbicides, partly because of the liability and increased government regulation associated with these materials. Thus, the present invention reduces the cost of weed eliminating and at the same time reduces environmental impact.

In summary, the precision of a weeder in accordance with the present invention ensures that no weed is overlooked, no weed gets more herbicide than is required, and no herbicide is sprayed on the bare ground. As a result, the weeder reduces labor, reduces equipment operating costs, reduces herbicide costs, significantly improves weed control, and dramatically reduces exposure to the herbicide of both the crop and the workers.

This description is illustrative only and not limiting. Although the invention has been described above with reference to the control of the application of herbicide material by spraying, the present invention may be used in conjunction with other agricultural materials such as fertilizers, fungicides, and insecticides. Note additionally that the term "light" is not limited to visible light, but refers to any radiation of appropriate wavelength. Those skilled in the art will be able to devise other weeders within the scope of the present invention upon consideration of the detailed description and the accompanying drawings. The present invention is set forth in the appended claims.

We claim:

1. Structure comprising:
   at least two substantially monochromatic light sources, each light source providing a light beam with a different wavelength, each said light beam being focused at an area of a surface, said surface being substantially stationary;
   a detector for detecting a reflectance of light from said area;
   means for analyzing said reflectance to determine whether said area is a plant;
   means for initiating a selected activity with respect to plants other than of a selected type in response to a signal from said means for analyzing; and
   means for moving said at least two substantially monochromatic light sources and said detector with respect to said surface so that said area is scanned across said surface.

2. The structure as in claim 1 wherein said selected activity comprises applying at least one herbicide to one or more of said plants other than of said selected type.

3. The structure of claim 1 wherein said light sources are light emitting diodes.

4. The structure of claim 1 wherein said light sources are lasers.

5. The structure of claim 1 wherein said light sources are chromatic light sources with filters.

6. The structure of claim 5 wherein said chromatic light sources are incandescent lights with filters.

7. The structure of claim 5 wherein said chromatic light sources are florescent lights with filters.

8. The structure of claim 1 wherein said light sources are modulated.

9. The structure of claim 8 further comprising a plate having an aperture positioned in operative relation to said detector, wherein said aperture limits said reflectance of said light beam from said predetermined surface area.

10. The structure of claim 9 further comprising a first lens for focusing said light beams at said predetermined surface area.

11. The structure of claim 10 further comprising a second lens for focusing said reflectance of said light beams through said aperture onto said detector.

12. The structure of claim 11 further comprising a sample and hold circuit for comparing a first reflectance during a first predetermined time frame to a second reflectance during a second predetermined time frame.

13. The structure of claim 1 wherein said means for analyzing includes a controller.

14. The structure of claim 13 wherein said means for initiating comprises a driver activated by said controller if a plant is detected.

15. The structure of claim 14 further comprising a valve coupled to said driver, wherein said valve is activated if said driver is activated.

16. The structure of claim 15 further comprising a nozzle coupled to said valve for spraying herbicide on said plant if said valve is activated.

17. The structure of claim 14 wherein said means for analyzing comprises a speed detector coupled to said controller for timing the activation of said driver.

18. The structure of claim 14 further comprising a hoe coupled to said driver, wherein said hoe is activated if said driver is activated.

19. The structure of claim 18 wherein said means for analyzing comprises a speed detector coupled to said controller for timing the activation of said driver.

20. The structure of claim 8 wherein said light sources are phased with respect to one another such that one of said light sources has a phase shift with respect to a phase of another of said light sources.

21. The structure of claim 8 wherein said light sources are multiple tone modulated.

22. The structure of claim 8 wherein said light sources have phases with no overlap and are synchronized with circuitry following said detector.

23. A method of determining a location of a plant comprising the steps of:
   moving at least two substantially monochromatic light sources over a surface area, each light source providing a light beam with a different wavelength;
   focusing said light beams at said surface area;
   detecting a reflectance of said light beams from said surface area;
   analyzing said reflectance to determine whether said surface area is a plant; and
   initiating a selected activity based on said analyzing.

24. The method of claim 23 further comprising a step of modulating said light sources.

25. The method of claim 24 wherein said step of modulating includes setting a phase of one of said light sources to be offset with respect to a phase of another of said light sources.

26. The method of claim 24 wherein said step of modulating includes multiple tone modulating.

27. The method of claim 24 wherein said step of modulating includes synchronizing said at least two substantially monochromatic light sources with said step of detecting a reflectance.

28. Structure comprising:
   means for generating radiation of a first selected substantially monochromatic wavelength during a first time interval and for generating radiation of a second selected substantially monochromatic wavelength during a second time interval;

means for directing said radiation of said first and second selected wavelengths to an area of a surface, said surface being substantially stationary, characteristics of materials in said area being determined by characteristics of those portions of said radiation of said first and second selected wavelengths reflected from said area;

means for receiving those portions of said radiation of said first and second selected wavelengths reflected from said area and for processing signals representative of the reflected portions of said radiation of said first and second selected wavelengths to provide an indication of said characteristics of said materials in said area;

means responsive to said means for receiving and processing for applying an herbicide to a selected area in response to said indication; and means for moving said means for generating and said means for directing with respect to said surface.

29. The structure of claim 28, wherein said means for generating comprises a light emitting diode.

30. The structure of claim 29, wherein said means for receiving and processing comprises an aperture having a length significantly greater than its width, said aperture extending lengthwise in a direction substantially perpendicular to a direction in which said means for moving moves said means for generating and said means for directing.

31. The structure of claim 28, wherein said means for receiving and processing comprises a plurality of radiation detectors for generating a plurality of signals, each of said plurality of radiation detectors detecting reflected radiation from a respective area of a corresponding plurality of areas and generating a respective signal, said means for receiving and processing providing said indication so that herbicide is applied or not applied to each of said plurality of areas based on said plurality of signals.

32. The structure of claim 31, wherein said means for receiving and processing provides said indication so that herbicide is applied to one of said plurality of areas only if an adjacent area of said plurality of areas is determined by said means for receiving and processing to be a plant.

33. The structure of claim 28, wherein said means for receiving and processing determines a period of time that said characteristics of said materials in said area indicate said area is a plant.

34. The structure of claim 28, further comprising: means for detecting a speed of movement with respect to said surface.

35. The structure of claim 34, wherein said area to which said means for applying applies herbicide is an area different from said area upon which said radiation of said first and second selected wavelengths is incident, said area to which said means for applying applies herbicide being disposed directly behind said area upon which said radiation of said first and second selected wavelengths is incident with respect to a direction of movement in which said means for moving moves said means for generating, said means for directing, said means for receiving and processing, sand said means for applying.

36. The structure of claim 28, wherein said first time interval and said second time interval overlap.

37. The structure of claim 28, wherein said first time interval and said second time interval do not overlap.

38. The method of claim 23, wherein said step of analyzing said reflectance and said step of initiating a selected activity result in the application of herbicide to said predetermined area if said predetermined area is a surface area of a plant and result in no herbicide being applied to said predetermined area if said predetermined area is an area of bare ground.

39. Structure comprising:
a first substantially monochromatic light source providing light of a first wavelength, said light of said first wavelength being modulated with a first modulation signal having a frequency, said light of said first wavelength being incident on an area of a surface, said surface being substantially stationary;

a second substantially monochromatic light source providing light of a second wavelength, said light of said second wavelength being modulated with a second modulation signal having a frequency, said light of said second wavelength being incident on said area of said substantially stationary surface;

a light detector detecting a portion of said light of said first wavelength and a portion of said light of said second wavelength reflecting from said area of said surface, said light detector having an output lead;

a filter circuit coupled to said output lead of said light detector, said filter circuit rejecting signals on said output lead of said detector circuit due to incident sunlight which have frequencies lower than said frequencies of said first and second modulation signals, said filter circuit outputting a detector output signal indicative of said first and second modulation signals;

a processing circuit which analyzes said detector output signal and causes an herbicide to be sprayed onto said area of said surface based on a determination of relative magnitudes of light of said first wavelength and light of said second wavelength which is detected by said detector after being reflected from said surface; and means for moving said first and second substantially monochromatic light sources, said light detector, said filter circuit, and said processing circuit over said area of said surface.

40. The structure of claim 39, wherein said first substantially monochromatic light source comprises a light emitting diode, said second substantially monochromatic light source comprises a light emitting diode, said frequency of said first modulation signal is substantially identical to said frequency of said second modulation signal, said first and second modulation signals have digital waveforms, and said processing circuit sprays said herbicide onto said area of said surface after said light detector no longer detects light of said first wavelength and said second wavelength reflecting from said area due to movement of said means for moving over said surface.

41. The structure of claim 40, wherein said light detector is a photodetector, and wherein said filter circuit comprises a capacitor having a first lead and a second lead, an inductor having a first lead and a second lead, and an amplifier having an input lead, said first lead of said capacitor being coupled to said first lead of said inductor, to said output lead of said light detector, and to said input lead of said amplifier, said second lead of said capacitor being coupled to said second lead of said inductor.

42. The structure of claim 41, wherein said filter circuit further comprises a phase detector, said phase detector having a first input lead, a second input lead, and an output lead, and wherein said amplifier has an output lead, said output lead of said amplifier being coupled to said first input lead of said phase detector, said second input of said phase detector being coupled to receive one of said modulation signals which modulate said first and second substantially monochromatic light sources.

* * * * *